United States Patent [19]
Van Dal

[11] Patent Number: 4,589,377
[45] Date of Patent: May 20, 1986

[54] ENGINE

[75] Inventor: David J. Van Dal, West Perth, Australia

[73] Assignees: Michael J. Quinsee; John Eller, both of West Perth, Australia

[21] Appl. No.: 637,691

[22] Filed: Aug. 6, 1984

Related U.S. Application Data

[63] Continuation of Ser. No. 296,207, Aug. 25, 1981, abandoned.

[30] Foreign Application Priority Data

Aug. 27, 1980 [AU] Australia ............................... PE5286
Feb. 23, 1981 [AU] Australia ............................... PE7717

[51] Int. Cl.⁴ ............................................ F02D 19/00
[52] U.S. Cl. ................................. 123/25 C; 123/25 R; 123/25 P
[58] Field of Search ................. 123/25 C, 25 D, 25 P, 123/25 R

[56] References Cited

U.S. PATENT DOCUMENTS

| 1,463,586 | 7/1923 | Kliesrath | 123/25 D |
| 1,698,468 | 1/1929 | Beals | 123/25 D |
| 1,776,943 | 9/1930 | Douthit | 123/25 C |
| 4,018,192 | 4/1977 | Eft | 123/25 C |
| 4,177,772 | 12/1979 | Franke | 123/25 C |

*Primary Examiner*—Ira S. Lazarus
*Attorney, Agent, or Firm*—Fleit, Jacobson, Cohn & Price

[57] ABSTRACT

The invention is related to the injection of water or other non-fuel materials into internal combustion engines, the amount of non-fuel material being injected and the time of injection being governed by such factors as mass of fuel induced, compression ratio of the engine, quality of the fuel and pre-selected peak temperature of combustion. By selection of these parameters the quantity of non-fuel material injected can be in excess of three times the quantity of fuel.

9 Claims, 5 Drawing Figures

ENGINE

This application is a continuation of application Ser. No. 296,207, filed Aug. 25, 1981, now abandoned.

This invention relates to an improved engine of the internal combustion type.

Current IC and CI production engines as used in automotive and stationary applications have a maximum thermal efficiency i.e. the ratio of the energy value of the fuel admitted to the cylinder compared with the energy available at the piston crown of about 30%. Similar basic inefficiency is shown by other types i.e. turbines, orbitals, rotaries etc.

Steam engines and turbines, as such, are far more efficient with figures of 80-85% being quoted.

The energy losses associated with the generation of steam reduce the overall efficiency of the system to little if any more than direct combustion.

In mobile applications the mass of the steam generator, having to be accelerated both positively and negatively imposes further fuel inefficiency on total vehicle operation.

It is possible to limit the waste heat of IC and CI engines by injecting water or other non-fuel material into the cylinder. Hitherto the amount of water has been limited to only a small proportion of the fuel/air mixture delivered to each cylinder ie. 7-10%. In the study of the behaviour of water injection into the combustion chamber it has been found that considerably increased quantities of water or other non-fuel material can be injected into the combination chamber provided that it is done in a manner which ensures that it is done at a point or in such a manner as to ensure that at least a substantial proportion of the potential of the expanding water or other non-fuel material is utilised.

The Otto or 4-stroke internal combustion cycle and the 2-stroke internal combustion cycle are well understood and are referred to as a "constant volume" cycles. The compression ignition (4- or 2-stroke) cycle is referred to as a "constant pressure" cycle. Both the "constant volume" and "constant pressure" cycles depend on the "charge mass" remaining constant throughout the cycle. The cycle of the present invention may be summarised as:

(1) induction of charge.
(2) compression of charge.
(3) addition to charge mass.
(4) expansion of the initial charge mass together with the added charge mass.

Desirably the added charge mass does not add to the potential energy of the reactants in the initial charge mass. Thus the present invention is characterized by the addition to the initial charge mass of an additional mass of expandable material at an appropriate stage of the cycle. In order to obtain the maximum advantage of the added mass, it should be added at a point in the cycle where the maximum potential of the expanding masses can be utilised. This has been determined to be shortly after the fuel-air mixture in the chamber has ignited but prior to self ignition of the end gas ie., the compressed gas ahead of the flame front during the combustion. By this selection of parameters it has been found that the ratio of added non-fuel material to fuel can be considerably increased beyond the limits hitherto considered possible and is in excess of 3:1 by mass.

Whilst water is an obvious choice as the non-fuel material to be injected into the combustion chamber as the added mass other suitable materials include inert gases such as argon, nitrogen, oxygen, carbon dioxide and ammonia.

Thus in its broadest form the invention resides in an internal combustion engine wherein each of the combustion chambers is fitted with an injector through which a quantity of water or other non-fuel material is injected into the combustion chamber characterised in that:

(i) the compression ratio of the engine is above that normally acceptable for the fuel to be used in the engine; and (ii) the amount of water or other non-fuel material is sufficient to maintain the maximum and mean temperatures of combustion at a level below the uncontrolled temperatures; and (iii) the injection is made after ignition of the fuel/air charge but prior to self ignition of the end gas.

The amount of mass added to the induced and compressed charge at the particular indicated point in the cycle, has been shown by both computer studies and practical tests as quantifiable resulting from the parameters of:

1. Mass of original reactants induced.
2. Compression ratio of the engine.
3. Quality of the fuel induced.
4. Pre-selected peak temperature of combustion.

This will be evident from the following calculations comparing spark ignition cycles with and without the injection of water as the added mass, reference being made to the P/V diagrams shown in FIGS. 1, 2 and 3 of the accompanying drawings.

The following calculations concern a comparison between (i) a normal spark ignition cycle with a compression ratio of 9 and (ii) a spark ignition cycle with a compression ratio of 16 and water injection after firing to limit the maximum temperature in the cycle. This second cycle would also be designed to operate at a much lower volumetric efficiency, since provision must be made within the cylinder for the subsequent expansion of the added mass (in this case $H_2O$) as a gas. For the purpose of the calculation, both engines have a swept/volume of 500 cc.

The calculations have been made using the air standard cycle, with the same modifications for both calculations. While this approach is not accurate for either case, the comparative result is thought to be an indicator of the potential of the added mass injection cycle. The philosophy of the added mass injection is that by reducing the maximum temperature in the cycle, energy dissipated in dissociation and heat transfer from the combustion chamber is reduced.

Figure 1:
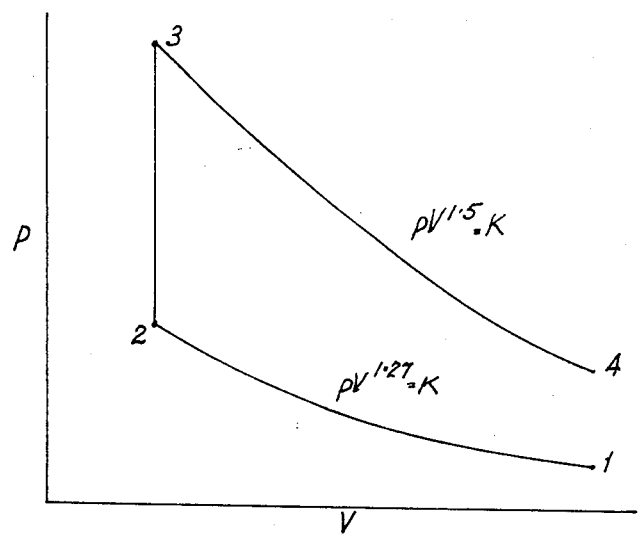
FIG. 1 is a pressure volume diagram for a conventional spark ignited internal combustion engine.

Internal Combustion Only (FIG. 1)

Swept volume $V_s = 500\,000$ mm$^3$ ($=500$ cc.)
Compression ratio $=9$
Therefore clearance volume $V_c = V_s/(C.R.-1) = 500\,000/8 = 62\,500$ mm$^3$.
Volume induced at volumetric efficiency $(\eta_v) = 0.8 = 0.8 \times 500\,000 = 400\,000$ mm$^3$.
This volume is induced at 383 K. and 100 kN/m$^2$.

Therefore mass of air in the cylinder $$= \text{Mass of Induced air} + \text{Mass in clearance volume}$$

$$= \frac{100 \times 10^3 \times 4 \times 10^{-4}}{287 \times 383} + \frac{100 \times 10^3 \times 0.625 \times 10^{-4}}{287 \times 383}$$

$$= 3.64 \times 10^{-4} + 5.68 \times 10^{-5}$$

$$= 4.21 \times 10^{-4} \text{ kg.}$$

Therefore $p_1 = \dfrac{mRT}{V} =$ $$\frac{4.21 \times 10^{-4} \times 287 \times 383}{5.625 \times 10^{-4}} = 82.3 \times 10^3 \text{N/m}^2.$$

$$(=0.823 \text{ bar} = 82.3 \text{ kN/m}^2.)$$

$$p_2 = p_1 \left(\frac{V_1}{V_2}\right)^{1.27} = 82.3 \times (9)^{1.27} = 1340 \text{ kN/m}^2.$$

$$T_2 = \frac{1340 \times 10^3 \times 0.625 \times 10^{-4}}{4.21 \times 10^{-4} \times 287} = 693 \text{ K.}$$

Mass of air induced $= 3.64 \times 10^{-4}$ kg.

Mass of fuel induced at 14:1 air fuel ratio, $$= \frac{3.64 \times 10^{-4}}{14} = 2.60 \times 10^{-5} \text{ kg.}$$

Energy equivalent of this fuel. ($L.C.V. = 46\,500$ kJ/kg.)

$$= 2.60 \times 10^{-5} \times 46500 = 1.209 \text{ kJ.}$$

Assume energy dissipated is dissociation to be 12% of total and energy dissipated in combustion chamber heat transfer to be 26% of total.

Therefore energy available for constant volume heating process $$= 1.209 \times (1 - 0.12 - 0.26)$$

$$= 0.750 \text{ kJ.}$$

Mass in cylinder $= 4.21 \times 10^{-4} + 2.60 \times 10^{-5}$ $$= 4.47 \times 10^{-4} \text{ kg.}$$

Temperature rise in constant volume heating process $$= \frac{Q}{m \times c_v} = \frac{0.750}{4.47 \times 10^{-4} \times 0.718} = 2336 \text{ K}$$

Therefore $T_3 = T_2 + 2336 = 693 + 2336 = 3029$ K.

$$p_3 = p_2 \times \frac{T_3}{T_2} = 1340 \times \frac{3029}{693} = 5857 \text{ kN/m}^2.$$

Assume index of expansion of 1.5 on the expansion process 3-4.

$$p_4 = p_3 \times \left(\frac{V_3}{V_4}\right)^{1.5} = \frac{5857}{91.5} = 217 \text{ kN/m}^2.$$

Compression process work $$= \frac{10^3(82.3 \times 5.625 \times 10^{-4} - 1340 \times 0.625 \times 10^{-4})}{0.27}$$

$$= -139 \text{ J.}$$

Expansion process work $$= \frac{10^3(5857 \times 0.625 \times 10^{-4} - 217 \times 5.625 \times 10^{-4})}{0.25}$$

$$= 488 \text{ J.}$$

Therefore useful work per cycle $= 488 - 139 = 349$ J.
This work required $2.60 \times 10^{-5}$ kg of fuel.
Therefore specific work $= 349/2.60 \times 10^{-5} = 13.4 \times 10^6$ J/kg fuel.
Note also that energy per liter of swept volume $= 698$ J/cycle.

From the above modelling the following optimizations were determined by computer analysis:

| I.C. ENGINE PERFORMANCE ANALYSIS: SI PETROL/AIR ONLY | |
|---|---|
| FINAL OPTIMUM - SPECIFIC WORK | |
| FIXED VALUES | |
| UNIT CONVERSION FACTOR: | 10 |
| SPECIFIC GAS CONSTANT: | 276 |
| LOWER CALORIFIC VALUE: | 46500 |
| ATMOSPHERIC AIR PRESSURE: | 1 |
| INDUCED AIR TEMPERATURE: | 373 |
| SPECIFIC HEAT OF AIR: | .718 |
| INDEX OF COMPRESSION: | 1.3 |
| SWEPT VOLUME: | 500 |
| COMPRESSION RATIO: | 8.6 |
| VOLUMETRIC EFFICIENCY: | .7 |
| AIR FUEL RATIO: | 15 |
| ENERGY LOSS TO HEAT TRANSFER: | .26 |
| ENERGY LOSS TO DISSOCIATION: | .12 |
| INDEX OF EXPANSION: | 1.224 |
| VOLUME OF AIR INDUCED: | 350 |
| COMPRESSION TEMPERATURE: | 711.309103906 |
| COMPRESSION PRESSURE: | 12.0522078731 |
| PRESSURE OF INDUCED AIR: | .734883720929 |
| MASS OF GAS IN CYLINDER: | 4.03883002761E-4 |
| CLEARANCE VOLUME: | 65.7894736842 |
| PUMPING WORK-NEGATIVE: | −125.706313007 |
| EXPANSION WORK-POSITIVE: | 526.23810042 |
| USEFUL WORK PER CYCLE: | 400.531787413 |
| SPECIFIC WORK: | 17671691.336 J/kg FUEL |
| ENERGY/LITER SWEPT VOLUME: | 801.063574826 J/Cycle |
| NETT ENERGY RATE: | 801.063574826 |
| POWER STROKE END PRESSURE: | 3.3641355146 |
| COMBUSTION PRESSURE: | 46.8489202687 |
| COMBUSTION TEMPERATURE: | 2764.97583233 |
| MASS OF FUEL INDUCED: | 2.266516429E-5 |
| MASS OF AIR INDUCED: | 3.3997746435E-4 |
| PRE-IGNITION DETONATION FACTOR: | .997936491589 |
| FINAL OPTIMUM - ENERGY/LITER | |
| COMPRESSION RATIO: | 8 |
| VOLUMETRIC EFFICIENCY: | .74 |
| AIR FUEL RATIO: | 15 |
| ENERGY LOSS TO HEAT TRANSFER: | .26 |
| ENERGY LOSS TO DISSOCIATION: | .12 |
| INDEX OF EXPANSION: | 1.224 |
| VOLUME OF AIR INDUCED: | 370 |
| COMPRESSION TEMPERATURE: | 696.042611685 |
| COMPRESSION PRESSURE: | 11.5322877754 |
| PRESSURE OF INDUCED AIR: | .772500000001 |

-continued

| I.C. ENGINE PERFORMANCE ANALYSIS: SI PETROL/AIR ONLY | |
|---|---|
| MASS OF GAS IN CYLINDER: | 4.28787904019E-4 |
| CLEARANCE VOLUME: | 71.4285714286 |
| PUMPING WORK-NEGATIVE: | −127.435423224 |
| EXPANSION WORK-POSITIVE: | 536.393198924 |
| USEFUL WORK PER CYCLE: | 408.9577757 |
| SPECIFIC WORK: | 17068129.0916 J/kg FUEL |
| ENERGY/LITER SWEPT VOLUME | 817.9155514 J/CYCLE |
| NETT ENERGY RATE: | 817.9155514 |
| POWER STROKE END PRESSURE: | 3.54412866988 |
| COMBUSTION PRESSURE: | 45.1743200773 |
| COMBUSTION TEMPERATURE: | 2726.5406778 |
| MASS OF FUEL INDUCED: | 2.39603165353E-5 |
| MASS OF AIR INDUCED: | 3.59404748029E-4 |
| PRE-IGNITION DETONATION FACTOR: | .992709630352 |

Figure 2:
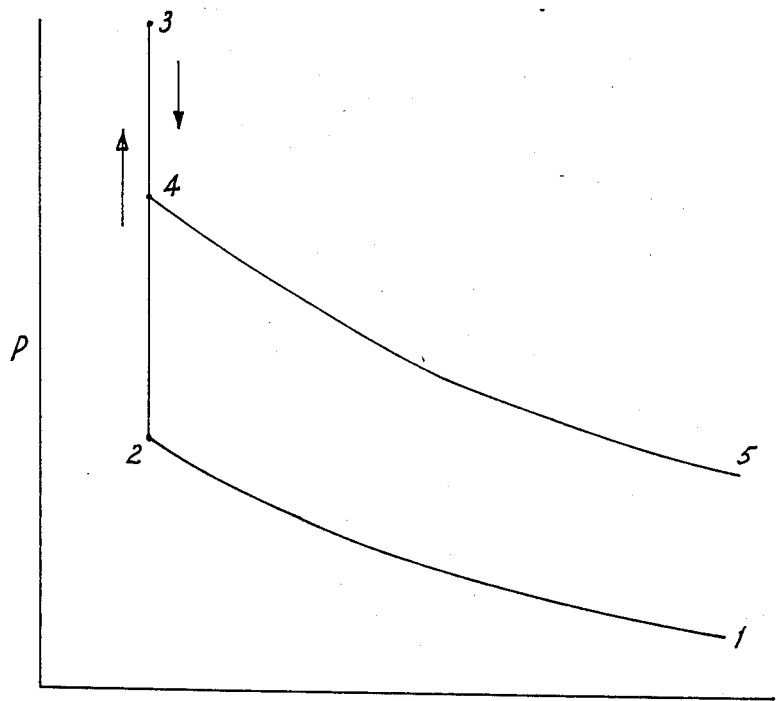
FIG. 2 is a pressure volume diagram for a spark ignited internal combustion engine including water injection.

Internal Combustion With Water Injection (FIG. 2)
$V_s = 500\,000$ mm$^3$.
C.R. = 16.
$V_c = 500\,000/15 = 33\,333$ mm$^3$.
Volume induced at volumetric efficiency $(\eta_v) = 0.4 = 0.4 \times 500\,000 = 200\,000$ mm$^3$.
This volume is induced at 383 K. and 100 kN/m$^2$.

Therefore mass of air in the cylinder
= Mass of induced air + Mass in clearance volume $$= \frac{100 \times 10^3 \times 2 \times 10^{-4}}{287 \times 383} + \frac{100 \times 10^3 \times 0.33 \times 10^{-4}}{287 \times 383}$$

$= 1.82 \times 10^{-4} + 3.00 \times 10^{-5}$
$= 2.12 \times 10^{-4}$ kg.

As previous calculation, $p_1 = 43.7$ kN/m$^2$, $p_2 = 1478$ kN/m$^2$ and $T_2 = 809$ K.
Mass of induced air $= 1.82 \times 10^{-4}$ kg.

Mass of fuel induced at 14:1 air fuel ratio, $$= \frac{1.82 \times 10^{-4}}{14} = 1.3 \times 10^{-5} \text{ kg.}$$

Energy equivalent of this fuel, $= 1.3 \times 10^{-5} \times 46500 = 0.605$ kJ.
Assume energy dissipated in dissociation is zero and that energy dissipated in combustion chamber heat transfer is 6% of the total. Therefore energy available for constant volume heating process, $= 0.605 \times 0.94 = 0.568$ kJ.
Now assume a constant volume heating process of the air only to condition 3. Then calculate the amount of water required to be injected to return the mixture to condition 4 such that dissociation losses are zero and heat transfer losses are 6% of the total.

Mass in cylinder $= 2.12 \times 10^{-4} + 1.3 \times 10^{-5}$
$= 2.25 \times 10^{-4}$ kg.
Temperature rise in constant volume heating process $$= \frac{0.568}{2.25 \times 10^{-4} \times 0.718} = 3516 \text{ K.}$$

$T_3 = 3516 + 809 = 4325$ K.

$p_3 = 1478 \times \frac{4325}{809} = 7901$ kN/m$^2$

Assume a final temperature at 4 of 2400 K.
Determine the quantity of water at 60° C. to be injected to achieve this final condition—that is cooling the combustion gas from 4325 K. to 2400 K. and changing the water from liquid at 60° C. to gas at 2400 K.

Figure 3:
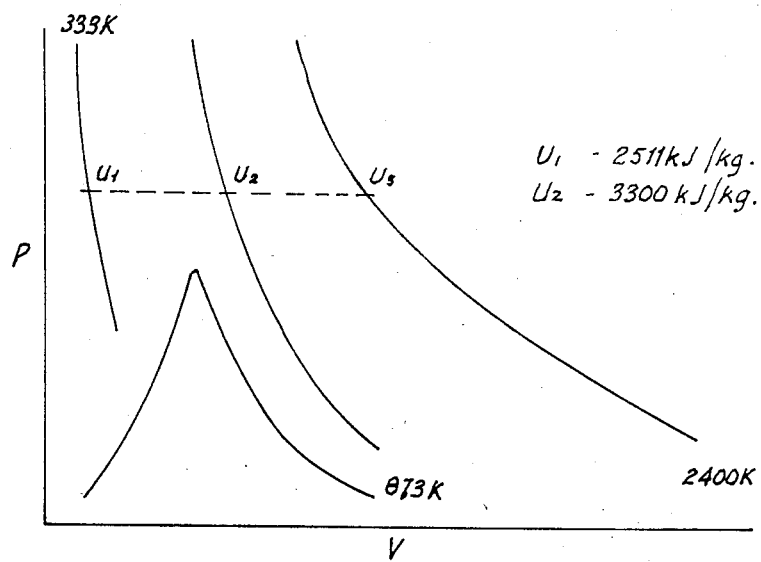
FIG. 3 is a pressure volume diagram showing the change in internal energy of water as it passes from the liquid to the gaseous phase at various temperatures.

Energy available in that gas cooling process,
$= m \times c_v \times (T_3 - T_4)$
$= 2.25 \times 10^{-4} \times 0.718 \times (4325 - 2400)$
$= 0.311$ kJ
Change of internal energy of water from liquid at 333K to gas at 2400K
$= u_3 - u_1$
$= (u_3 - u_2) + (u_2 - u_1)$
$= c_v(T_3 - T_2) + (u_2 - u_1)$ The water addition energy calculation is shown in FIG. 3 of the accompanying drawings.

Specific heat at constant volume of water in this temperature range,
$= c_p - R$ $= 2.609 - \frac{8.314}{18}$ $= 2.147$ kJ/kg · K
Therefore $u_3 - u_1 = 2.147 (2400 - 873) + (3300 - 251)$
$= 6327.469$ kJ/kg.
Therefore mass of water required to be injected, $$= \frac{Q}{u_3 - u_1} = \frac{0.311}{6327} = 4.91 \times 10^{-5}$$

Therefore water − fuel ratio $= 4.91 \times 10^{-5} = 3.78$
Partial Pressures of each gas are, $$pp \text{ (Air/fuel)} = \frac{2.25 \times 10^{-4} \times 287 \times 2400}{33.3 \times 10^{-6} \times 10^3} = 4654 \text{ kN/m}^2$$

$$pp \text{ (water)} = \frac{5.7 \times 10^{-5} \times 517 \times 2400}{33.3 \times 10^{-6} \times 10^3} = 2124 \text{ kN/m}^2$$

Sum of partial pressures $= P_4 = 6778$ kN/m$^2$

In the expansion process the partial pressures remain in the same ratio. The mixture can therefore be taken as a single gas expanding from $P_4 - V_4$ to $P_5 - V_5$ with an index of expansion of 1.5, $$p_5 = p_4 \left(\frac{V_4}{V_5}\right)^{1.5} = \frac{6778}{16^{1.5}} = 105.9 \text{ kN/m}^2$$

Compression process work $$= \frac{10^3(43.7 \times 5.333 \times 10^{-4} - 1478 \times 0.333 \times 10^{-4})}{0.27}$$

$= -96$ J

Expansion process work $$= \frac{10^3(6778 \times 0.333 \times 10^{-4} - 95.7 \times 5.333 \times 10^{-4})}{0.5}$$

$= 432$ J

Therefore useful work per cycle $= 432 - 96 = 336$ J
This work required $1.3 \times 10^{-5}$ kg fuel
Therefore, specific work $= 336/(1.3 \times 10^{-5}) = 25.8 \times 10^6$ J/kg fuel
The energy per liter swept volume $= 672$ J/cycle From the above modelling the following optimizations were determined by computer analysis:

| I.C. ENGINE PERFORMANCE ANALYSIS: SI PETROL/AIR/WATER | |
|---|---|
| FINAL OPTIMUM SPECIFIC WORK | |
| FIXED VALUES | |
| UNIT CONVERSION FACTOR: | 10 |
| SPECIFIC GAS CONSTANT: | 276 |
| LOWER CALORIFIC VALUE: | 46500 |
| ATMOSPHERIC AIR PRESSURE: | 1 |
| INDUCED AIR TEMPERATURE: | 323 |
| SPECIFIC HEAT OF AIR: | .718 |
| INDEX OF COMPRESSION: | 1.3 |
| SWEPT VOLUME: | 500 |
| FACTOR: | 461.888 |
| WATER/FUEL RATIO FACTOR: | 1591 |
| PARTIAL PRESSURE - GAS: | 1.47 |
| PARTIAL PRESSURE - WATER: | .0023 |
| COMPRESSION RATIO: | 19.3 |
| VOLUMETRIC EFFICIENCY: | .48 |
| AIR FUEL RATIO: | 15 |
| WATER/FUEL RATIO: | 3.54094084555 |
| ENERGY LOSS TO HEAT TRANSFER: | .16 |
| ENERGY LOSS TO DISSOCIATION: | .06 |
| INDEX OF EXPANSION: | 1.214 |
| SELECTED COMBUSTION TEMP: | 2500 |
| PUMPING WORK - NEGATIVE: | −127.454054679 |
| EXPANSION WORK - POSITIVE: | 641.762145388 |
| USEFUL WORK PER CYCLE: | 514.308090709 |
| SPECIFIC WORK: | 28655961.0441 J/kg FUEL |
| ENERGY/LITER SWEPT VOLUME: | 1028.61618142 J/Cycle |
| PRE-IGNITION DETONATION FACTOR: | .998334199382 |
| FINAL OPTIMUM - ENERGY/LITER | |
| COMPRESSION RATIO: | 18.4 |
| VOLUMETRIC EFFICIENCY: | .5 |
| AIR FUEL RATIO: | 15 |
| WATER/FUEL RATIO: | 3.4451949636 |
| ENERGY LOSS TO HEAT TRANSFER: | .16 |
| ENERGY LOSS TO DISSOCIATION: | .06 |
| INDEX OF EXPANSION: | 1.214 |
| SELECTED COMBUSTION TEMP: | 2500 |
| PUMPING WORK - NEGATIVE: | −129.683726206 |
| EXPANSION WORK - POSITIVE: | 656.716759285 |
| USEFUL WORK PER CYCLE: | 527.033033079 |
| SPECIFIC WORK: | 28190364.4997 J/kg FUEL |
| ENERGY/LITER SWEPT VOLUME: | 1054.06606616 J/CYCLE |
| PRE-IGNITION DETONATION FACTOR: | .997166185822 |

Figure 4:
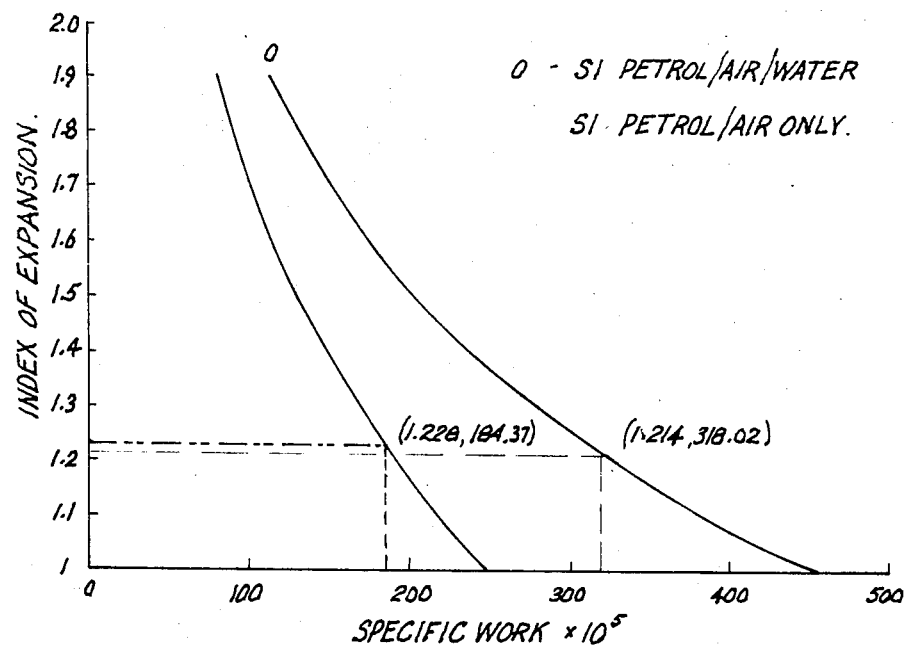
FIG. 4 is a diagram showing index of expansion plotted against specific work for a conventional cycle and for a water injected cycle.

Plotting index of expansion against specific work as in FIG. 4 of the drawings it is seen that the added mass cycle reduces the index of expansion achieving a mark gain in specific work.

CONCLUSION

A petrol spark ignition 4-stroke engine at "state of the art" design has a power limitation directly proportioned to the octane rating of the fuel × peak compression pressure × combustion temperature and in some manner proportional to the surface area and shape of the combustion space. In the evaluation above by allocating unity to the shape and area of the combustion space and fuel quality,
$698/J/Hz\ 1 \times 5857 \times 3029 \times 1 = 1.8 \times 10^7$
From specific work the energy produced requires,
$698/(13.4 \times 10^6) = 5.2 \times 10^{-5}$ kg fuel/cycle
With water injected immediately behind the flame front,
$672\ J/Hz\ 1 \times 4654 \times 2400 \times <1 = <1.1 \times 10^7$
From specific work the energy produced requires,
$672/25.8 \times 10^6 = 2.6 \times 10^{-5}$ kg fuel/cycle
The fuel efficiency improvement factor is therefore, $$\frac{672}{698} \times \frac{5.2}{2.6} = 1.93 \text{ for equal power and swept volume.}$$

A prototype engine was constructed by modifying a 250 cm³ 4-valve 4-stroke single cylinder engine. All engine components were conventional, except:

1. Compression ratio 17.5:1
   Clearance Vol. 15.31 cm³
   Bore 74 mm
   Stroke 57.8 mm
2. Water injection unit—Detroit S.60—combined pump and injector 450 p.s.i. pintel valve pressure—8×0.0055"φ nozzle jets spraying at 160° included angle. Water used contained 1 part in 60 Mobil Soluble Oil and 1 part in 200 "Finish" Drying Aid to prevent scouring.
   Injector driven by a rocker from a second camshaft driven by chain from the valve camshaft. The injector camshaft had a timing adjustment facility.
3. Head modified to accommodate injector in lieu of one inlet valve. Piston modified to produce compression ratio following contours of roof head.

The engine was loaded by a disc brake dynamometer driven through the engine gearbox. The reaction arm on this brake was 0.35 m.

Provision was made for measuring both water flow rate and fuel flow rate by timing displacement from vertical transparent tubes.

Figure 5:
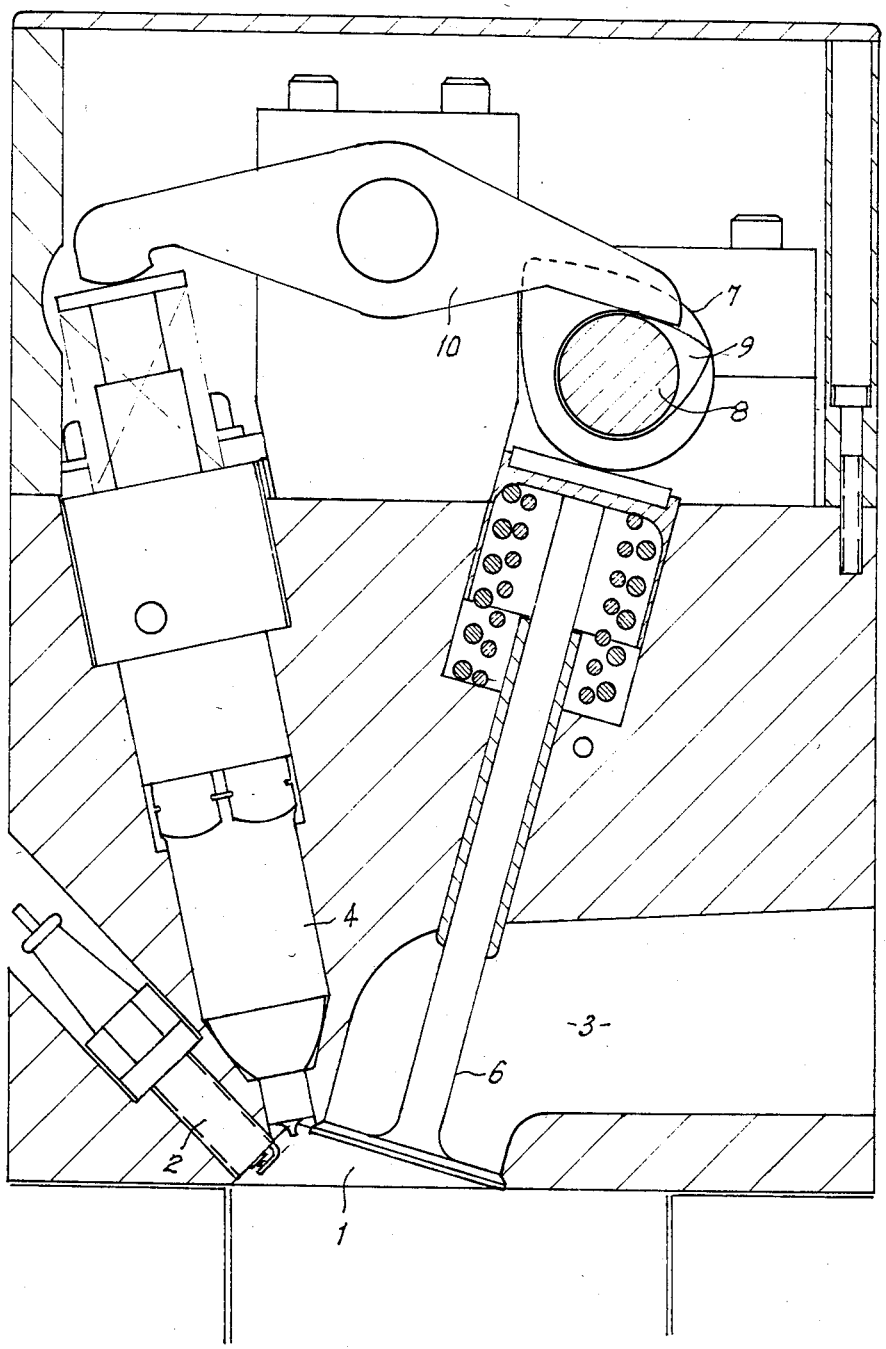
FIG. 5 is a fragmentary sectional view of a combustion chamber and cylinder head of an engine that includes a water injector.

FIG. 5 of the accompanying drawings is a diagrammatic fragmentary sectional elevation of the modified engine showing the position of the injector and its method of operation. As shown in the drawing the combustion chamber 1 is provided with a spark plug 2, and outlet port 3 and a water injector 4. (the inlet port is not shown) The outlet port 3 is fitted with a poppet valve 6 actuated by a cam 7 mounted on shaft 8. An additional cam 9 is provided on the shaft 8 to actuate a rocker arm 10 which in turn actuates the water injector.

INITIAL TESTS

The engine was initially fired on super grade motor spirit and set to run at approximately 1500 rpm.

In this initial test the engine was driving the output shaft through first gear with no load from the calipers surrounding the flywheel.

With petrol only being supplied and a constant speed from the engine water was seen to boil on the head fins.

The injector rack was gradually moved in to supply water to the engine at approximately 6° (crank-shaft) after ignition. The engine immediately picked up revs. and ran at approximately 2500 rpm. Within about 60 seconds of adding water the head fin temperature had become low enough to be comfortable to the touch and the exhaust temperature appeared to be dramatically reduced.

The injector rack was then advanced to full on position and although the engine continued to run smoothly revolutions dropped to just below 2000 rpms.

Development of the engine controls and testing procedures then took place over a number of days. These required the strengthening of the dynamometer to accommodate the increased torques which were developed.

FINAL TESTS

| 1. Speed | = 4000 r.p.m. — output shaft speed 1000 r.p.m. (engine in third gear). |
|---|---|
| Reaction arm force | = 10 kg.f. |
| Water flow rate | = 10 cm (7 mm φ tube) in 3.4 secs. |
| Fuel flow rate | = 10 cm (4.9 mm φ tube) in 10.1 secs. |

Results derived from above are:
Power = $2\pi$ NT =

$$2\pi \times \frac{4000}{4 \times 60} \times \frac{10 \times 9.81 \times 0.35}{1000} = 3.60 \text{ kW.}$$

Torque at engine shaft = $\frac{10 \times 0.35}{4}$ = 0.88 kg.f./m.

Water flow rate = $10 \times \frac{\pi}{4} \times (0.7)^2 \times \frac{1}{3.4}$ = 1.13 cc/sec.

Petrol flow rate = $10 \times \frac{\pi}{4} \times (0.489)^2 \times \frac{1}{10.1}$ = 0.19 cc/sec.

Water to fuel ratio = $\frac{1.13}{0.19}$ = 6

Specific fuel consumption = $\frac{0.19}{1000} \times \frac{3600}{3.6}$ = 0.19 liters/kW.h.

Timing for the above test was:
(a) Ignition 12° before T.D.C.
(b) Water 45° after T.D.C.

It was felt that the above timings were too retarded for the type of operation required in this engine. The timing was adjusted for the next test.

| 2. Speed | = 4000 r.p.m. — output shaft speed 1000 r.p.m. (Third gear). |
|---|---|
| Reaction arm force | = 10 kg.f. |
| Water flow rate | = 8 cm (7 mm φ tube) in 4.5 secs. |
| Fuel flow rate | = 5 cm (4.9 mm φ tube) in 7 secs. |

Results derived from above are:
Power = 3.60 kW.
Torque at engine shaft = 0.88 kg.f./m.

Water flow rate = $8 \times \frac{\pi}{4} \times (0.7)^2 \times \frac{1}{4.5}$ = 0.68 cc/sec.

Petrol flow rate = $5 \times \frac{\pi}{4} \times (0.489)^2 \times \frac{1}{7}$ = 0.13 cc/sec.

Water to fuel ratio = $\frac{0.68}{0.13}$ = 5.23

Specific fuel consumption = $\frac{0.13}{1000} \times \frac{3600}{3.60}$ = 0.13 liters/kW.h.

Timing for the above test was:
(a) Ignition 22° before T.D.C.
(b) Water at T.D.C.

Further practical analysis has established that it is preferable that the water injection which occupies 30° of crankshaft rotation is initiated at 10° before top dead centre with the ignition spark at 25° before top dead centre.

Clearly with each design of engine and the type and quality of fuel to be used there is a specific and individually calculable mass ratio of non-fuel material to be injected to the fuel in the induced chage to achieve the desired performance.

It will be evident from the foregoing that water injection into internal combustion engines in accordance with the present invention has the following advantages.

1. Production configuration does not depart from current I.C. or C.I. technology.

2. Peak temperatures and pressures are reduced so that in the embodiment depicted the effective compression ratio is raised from 9:1 to 17.5:1 without detonation when using motor spirit of the same octane (anti-knock) rating.

3. Mean temperatures are reduced and mean pressures increased permitting the use of lighter engine construction far lower cost (both in money and energy terms) materials.

4. Very high torque at low engine speeds will permit lower cost transmissions in automotive applications.

5. A radiator is no longer necessary but the water jacket is used for the dual purpose of:
(a) keeping the engine hot enough to work at current efficiencies as a petrol IC engine.
(b) Condensing the steam from the exhaust gases to recover a majority of the water used.

6. Exhaust gases being "scrubbed" no longer contain nitrogen oxides, or carbon dioxide as atmospheric pollutants.

Whilst the invention has been described with particular reference to a spark ignition piston engine it is equally applicable to all other types of internal combustion engines including turbines, orbitals, rotaries and similar configurations as well as all types of compression ignition engines.

I claim:

1. An internal combustion engine of the spark ignition or compression ignition type wherein each combustion chamber is fitted with an injector through which a quantity of water or other non-fuel material is injected into the combustion chamber, said engine comprising:
   (i) a piston and cylinder having a combustion chamber wherein the compression ratio of the engine is greater than that normally acceptable for the fuel used in the engine;
   (ii) injection means for adding to the combustion chamber an amount of water or other non-fuel material sufficient to maintain the maximum and mean temperatures of combustion at a selected level below the uncontrolled temperatures;
   (iii) wherein the addition is made after the fuel/air change has been ignited but prir to self-ignition of the end gas, and is initiated prior to the piston reaching the top dead center position; and
   (iv) wherein the air entering the combustion chamber is limited such that the volumetric efficiency of the engine is significantly lower than that normally acceptable for such an engine and the volumetric efficiency of the air intake is maintained between approximately 0.4 and 0.5.

2. An internal combustion engine as claimed in claim 1 wherein the ratio of non-fuel material injected to the fuel is in excess of 3:1 by mass.

3. An internal combustion engine as claimed in claim 1 wherein the injection means adds non-fuel material to the combustion chamber during about 30° of crankshaft rotation.

4. An internal combustion engine as claimed in claim 1 having a compression ratio of the order of 18.7:1, the fuel (unleaded motor spirit) has an octane rating of 90;

the ratio of water injected to fuel is between 3.4:1 and 3.6:1 and the water is injected at 10° before top dead centre with the ignition spark at 25° before top dead centre.

5. An internal combustion engine as claimed in claim 1 wherein the volumetric efficiency is maintained less than that which would result in pre-ignition or detonation at the compression ratio and operating pressure of the engine.

6. An internal combustion engine as claimed in claim 1, wherein the injection means is operated by a rocker arm actuated by an injection cam carried on a camshaft, the injector cam being separate from and in addition to cams for operating combustion chamber inlet and outlet valves.

7. An internal combustion engine as claimed in claim 6, wherein said injector cam is positioned on a camshaft on which cams for operating the combustion chamber inlet and outlet valves are positioned.

8. An internal combustion engine wherein each of the combustion chambers is fitted with an injector through which a quantity of water or other non-fuel material is injected into the combustion chamber, characterised in that
  (i) the amount of water or other non-fuel material is in excess of three times the amount of fuel in the induced charge;
  (ii) the water or other non-fuel material is injected after the fuel/air mixture has been ignited, before combustion is complete, before temperatures and pressures within the combustion chamber cause detonation, and initiation of injection is effected before the piston reaches the top dead center position; and
  (iii) the air flow into the combustion chamber is limited such that the volumetric efficiency of the air intake is significantly lower than that normally acceptable for the engine and is maintained between approximately 0.4 and 0.5.

9. An internal combustion engine as claimed in claim 8 wherein the injection is initiated about 15° after ignition is initiated.

* * * * *